(12) United States Patent
Mosler et al.

(10) Patent No.: US 8,118,258 B2
(45) Date of Patent: Feb. 21, 2012

(54) SEPARATION ELEMENT FOR ATTENUATING THE PROPAGATION OF LIGHT IN AN AIRCRAFT

(75) Inventors: Michael Mosler, Hamburg (DE); Andreas Neumann, Wakendorf (DE); Benjamin Landes, Hamburg (DE)

(73) Assignee: Airbus Operations GmbH (DE)

( * ) Notice: Subject to any disclaimer, the term of this patent is extended or adjusted under 35 U.S.C. 154(b) by 383 days.

(21) Appl. No.: 12/399,172

(22) Filed: Mar. 6, 2009

(65) Prior Publication Data

US 2009/0230245 A1 Sep. 17, 2009

Related U.S. Application Data

(60) Provisional application No. 61/069,063, filed on Mar. 12, 2008.

(30) Foreign Application Priority Data

Mar. 12, 2008 (DE) .......................... 10 2008 013 790

(51) Int. Cl.
*B64C 1/06* (2006.01)

(52) U.S. Cl. ..................................... 244/118.5; 244/119

(58) Field of Classification Search .............. 244/117 R, 244/118.2, 118.5, 118.6, 120, 122 AH, 129.1
See application file for complete search history.

(56) References Cited

U.S. PATENT DOCUMENTS

| | | | | | |
|---|---|---|---|---|---|
| 4,597,549 | A | * | 7/1986 | Ryan ........................... | 244/118.5 |
| 5,086,540 | A | * | 2/1992 | Schumacher ................ | 16/87.4 R |
| 5,165,626 | A | * | 11/1992 | Ringger et al. ............. | 244/118.5 |
| 5,393,013 | A | * | 2/1995 | Schneider et al. ......... | 244/118.5 |
| 5,577,358 | A | * | 11/1996 | Franke ......................... | 52/238.1 |
| 5,716,026 | A | * | 2/1998 | Pascasio et al. ............ | 244/118.6 |
| 5,816,534 | A | * | 10/1998 | Schumacher ................. | 244/119 |
| 6,257,523 | B1 | * | 7/2001 | Olliges ....................... | 244/118.5 |
| D456,338 | S | * | 4/2002 | Granzeier et al. .......... | D12/345 |
| 6,523,779 | B1 | * | 2/2003 | Michel ....................... | 244/118.5 |
| 6,588,705 | B1 | * | 7/2003 | Frank ......................... | 244/118.5 |
| D539,210 | S | * | 3/2007 | Guard et al. ................ | D12/345 |
| 7,380,752 | B2 | * | 6/2008 | Guard et al. ............... | 244/118.5 |
| 7,455,263 | B2 | * | 11/2008 | Lau et al. ................... | 244/118.5 |
| D589,869 | S | * | 4/2009 | Bock ........................... | D12/345 |
| 7,530,529 | B2 | * | 5/2009 | Bock ........................... | 244/118.5 |
| 2006/0214055 | A1 | * | 9/2006 | Novak et al. ............... | 244/118.5 |
| 2007/0018044 | A1 | * | 1/2007 | Bock ........................... | 244/118.5 |
| 2009/0159739 | A1 | * | 6/2009 | Wilson ........................ | 244/17.11 |
| 2009/0283636 | A1 | * | 11/2009 | Saint-Jalmes et al. ..... | 244/118.5 |
| 2011/0062283 | A1 | * | 3/2011 | Breuer et al. .............. | 244/118.5 |
| 2011/0084164 | A1 | * | 4/2011 | Lee ............................. | 244/118.5 |

FOREIGN PATENT DOCUMENTS

| | | |
|---|---|---|
| DE | 202007013134 U1 | 11/2007 |
| EP | 1717142 | 11/2006 |

* cited by examiner

*Primary Examiner* — Benjamin P Lee
*Assistant Examiner* — Joshua Freeman
(74) *Attorney, Agent, or Firm* — Lerner, David, Littenberg, Krumholz & Mentlik, LLP (57) ABSTRACT

The invention relates to a separation element for separating a first space from a second space in an aircraft. The separation element can be affixed between a ceiling region of the cabin, a hatrack in the ceiling region of the cabin, and between a movable space separation device. Furthermore, as a result of attachment between the ceiling region, the hatrack and the movable space separation device, the separation element is connectable in a lightproof manner to the ceiling region, and in a lightproof manner to the hatrack. Furthermore, the separation element is designed in such a manner that it is connectable in a lightproof manner to the movable space separation device.

18 Claims, 9 Drawing Sheets

SEPARATION ELEMENT FOR ATTENUATING THE PROPAGATION OF LIGHT IN AN AIRCRAFT

CROSS-REFERENCE TO RELATED APPLICATIONS

This application claims the benefit of the filing date of U.S. Provisional Patent Application No. 61/069,063, filed Mar. 12, 2008, the disclosure of which is hereby incorporated herein by reference.

The invention relates to the separation of spaces in aircraft. In particular, the invention relates to a separation element for separating a first space from a second space in an aircraft; to a separation system for separating a first from a second space in an aircraft; as well as to an aircraft comprising such a separation element.

BACKGROUND OF THE INVENTION

In order to separate the space which in aircraft is allocated to different passenger classes, known concepts not only use separation walls that are installed so as to be fixed, but also movable space separation devices, for example curtains. Parallel to this requirement of isolating the different classes as well as possible from each other, both visually and acoustically, for passenger comfort, there is a need to provide considerable stowage space in an aircraft. This stowage space is, among other things, created by means of various stowage bins which can, for example, be installed in the overhead region as so-called hatracks. Normally, these hatracks extend continuously over extended distances along the aircraft's longitudinal axis (x-axis), and therefore the above-mentioned separation arrangements can adjoin these hatracks. In this arrangement the space separation devices usually extend so as to be perpendicular to the hatracks, along the aircraft's cross direction (y-axis). Thus, in hitherto-known solutions the requirement for comfort by acoustically and visually separating the flight classes conflict with requirement for space, or the requirement for stowage space in aircraft.

SUMMARY OF THE INVENTION

A separation element, a separation system and an aircraft comprising a separation element according to the characteristics of the independent claims are stated. Exemplary embodiments of the invention are stated in the subordinate claims.

The described exemplary embodiments equally relate to the separation element, the separation system and an aircraft comprising a separation element. This may result in synergetic effects, even if they are not explicitly described in each individual combination.

According to an exemplary embodiment of the invention, a separation element for separating a first space from a second space in an aircraft is stated. In this arrangement the separation element comprises a first edge, which can be oriented to a suspension device of a movable space separation device; likewise, the separation element comprises a second edge that can be oriented to a hatrack, as well as a third edge that can be oriented to the movable space separation device. In this arrangement the first edge comprises a first edge progression that is adapted to, e.g. conforms to the suspension device; the second edge comprises a second edge progression that is adapted to, e.g. conforms to the hatrack, wherein the third edge comprises a third edge progression that is adapted to, e.g. conforms to the movable space separation device. In this arrangement the first edge progression, the second edge progression and the third edge progression conform in such a manner that propagation of light between the first space and the second space is reducible.

Below, and in the aforesaid, the term "edge" refers to a geometric shape that comprises an edge surface, wherein the edge surface in turn comprises a contour and a delimitation. In this arrangement the contour can be designed to be either flat or relief-like. Furthermore, below, reference is made to a reduction, for example, in the propagation of light. This does not exclude complete lightproofness, but rather includes it. The same applies analogously to the propagation of noise and odours.

Based on the device according to the invention, the insertion or installation of the separation element may result in a reduction in the propagation of light between the two spaces to be separated. This may, for example, be achieved in that in the region of these edges the shape of the separation element is designed so as to have a positive fit with the opposite contour profile of the suspension device; likewise with the hatrack and with the movable space separation device. Thus, in all the regions of the separation element a reduction in light transmission as well as improved noise containment can be achieved between the two spaces to be separated, as can an odour barrier. In this arrangement it is also possible for physical contact to arise between the separation element and the space separation device. Also possible is a conforming design of the three edge progressions of the three edges that do not rest along the entire edge surfaces against their corresponding opposites, but do so only in a partial region of the edge, as long as in this way the desired reductions in the propagation between the spaces is achieved.

In other words, the term "separation element" refers to a component which can be affixed between a ceiling region of a cabin, a hatrack in the ceiling region, and between a movable space separation device, as a result of being affixed in this region closes off the two spaces to be separated, in such a manner that they may be separated from acoustic as well as visual signals. Propagation of odours between the two spaces may also be reduced or prevented.

It may thus be possible, for example, to implement evening-sky simulations or other light effects on the cabin ceiling without this being impeded by incident light. This may result in enhanced passenger comfort and enhanced quality of service to passengers. Moreover, it may be possible in this way for aircraft operators to achieve an enhanced image and better customer acceptance or an increased recognition value. Likewise, simple geometric shapes could be used for movable space separation devices, which do not have to conform to the overhead region with the hatracks. Likewise, the suspension device of the movable space separation device, which suspension device is accommodated in the ceiling region in a so-called header panel, can be of a simple design. It is thus possible, for example, to provide a lightweight curtain attachment that does not need any additional attachments. Likewise, the desired uniform appearance in the ceiling region is implemented, and the light-proof or light-reducing solution for separating classes may offer simple operation.

In this arrangement the separation element can comprise, for example, CFK, thermoplastic material, honeycomb material or a hollow-chamber system that is lined with panels; however, any other material is feasible that makes it possible to integrate the separation element in a light-reducing manner in the described region.

In this arrangement the separation element can, for example, be affixed in this region by means of a mechanism on the side of the first edge; however, affixation by means of a mechanism on the second edge is also possible. In this arrangement both snap-and-click closing devices and closing devices that act by means of press studs are possible, by means of which closing devices the separation element is kept in the desired position. However, other mechanisms are also possible.

In order to provide improved visual, acoustic and odour-related separation of the two spaces, it may also be possible for all the edges of the first edge surface, the second edge surface and the third edge surface to rest directly against their correspondingly-opposite elements, as described above.

According to a further exemplary embodiment of the invention, the first edge comprises a first edge surface, wherein a contour of the first edge surface closes off having a positive fit with the suspension device.

According to a further exemplary embodiment of the invention, the second edge comprises a second edge surface, wherein a contour of the second edge surface closes off having a positive fit with the hatrack device.

In a first case, in which only the delimitation of the first edge conforms to the progression and the contour of the suspension device, while the contour of the first edge surface is, however, spaced apart, at least in some parts, from the contour of the suspension device, this space that consequently arises can be filled in by a further medium. In this arrangement the medium can, for example, be a foam material, for example a polyurethane foam, so that as a result of filling-in the further medium a positive fit results between the entire contour of the first edge surface and the entire contour of the suspension device. This medium can form part of the separation element in that it is, for example, applied to a surface of the separation element. In a second case the first edge per se can, for example, also be designed with a precise conforming contour that has a positive fit with the contour of the suspension device. Thus the entire first edge surface closes off with the surface of the suspension device, which surface is opposite to it, and rests practically against it on its full surface. In this arrangement it is not impossible for the first edge surface to have a relief-like shape or contour that differs from the complete flat shape.

In this arrangement, the statements made in relation to the first edge and the contour of the suspension device analogously apply to the second edge and to the contour of the hatrack. In other words, the second edge, which is oriented towards the hatrack, can be formed in such a manner that in a first case only the delimitation of the second edge surface completely conforms to the contour progression of the hatrack. However, it may also be possible for regions without contact to arise in the spatial region between the second edge surface and the hatrack. Also possible is the second case, in which the contour of the second edge follows the contour of the hatrack precisely, having positive fit, and rests against the entire surface. In all the cases mentioned it is possible to achieve an improvement in light dimming between the spaces to be separated, as well as an improvement in checking or attenuating acoustic signals and odours.

According to a further exemplary embodiment of the present invention, the separation element comprises a geometrically variable sealing medium in such a manner that propagation of light, during relative movement of the separation element to at least one object comprising the suspension device, the hatrack and the movable space separation device, can be reduced.

In this arrangement the geometrically variable sealing medium may be a filling compound or sealing compound that is elastic to such an extent that in the case of forces that are experienced, and in the case of consequent twisting, for example during the takeoff or landing phase of an aircraft, relative movements and displacement of the elements of the separation element and of the objects located around it are compensated for in such a manner that a reduction in light transmission may still be ensured.

If the separation element is, for example, affixed to the first edge by means of a affixation mechanism, then the sealing medium can, for example, be distributed along the delimitation of the second edge surfaces or over the entire second edge surface. Furthermore, in the case of the separation element being affixed by means of a mechanism that is attached to the second edge, it is also possible to place the sealing medium along the delimitation of the first edge surface. In this arrangement it can, in particular, be ensured that the sealing medium is not visually transparent, i.e. that this medium, too, results in a reduction in light transmission.

According to a further exemplary embodiment of the invention, a separation system for separating a first space from a second space in an aircraft is stated, wherein the separation system comprises a separation element according to any one of the previous exemplary embodiments. Furthermore, the separation system comprises a covering hood, wherein the contour of the covering hood conforms to that of the hatrack. The contour of the covering hood conforms to the second edge of the separation element in such a manner that propagation of light between the first space and the second space is reduced.

By means of the combined use of a covering hood and a separation element, which use may constitute a separation system, an improved appearance in the overhead region, and at the same time a light-proof, noise-proof and odour-proof separation, can be ensured. Since the covering hood may comprise a contour that conforms to that of the hatrack, said covering hood is visually fully integrated in the normal hatracks along the x-axis of the aircraft. Apart from the full visual integration of the covering hood in the existing hatracks as a result of the contour of the covering hood, which contour conforms to that of the second edge of the separation element, a reduction in the propagation of light and a reduction in the acoustic propagation between the spaces to be separated may be achieved.

According to a further exemplary embodiment of the present invention, the contour of the covering hood closes off, having positive fit, with the contour of the second edge surface of the separation element.

As a result of the conformity, having positive fit, of the two contours, of the covering hood and of the second edge surface to each other, there is a very high degree of reduction in the transmission of visual or acoustic signals. In this arrangement in a first case it is possible for only the delimitation of the second edge surface of the separation element to conform to the contour of the covering hood, wherein conformity of the remaining second edge surface to the contour of the covering hood can be achieved by an additional material, for example a foam material, as a filler. However, full inherent closing off, having positive fit, of the two surfaces is also possible; this may provide improved protection against the transmission of acoustic and visual signals.

According to a further exemplary embodiment of the present invention, the covering hood extends in lateral direction above the hatrack in such a manner that an opening mechanism of the hatrack is covered up by the covering hood.

In this way it may be possible, for example, to ensure that a normal hatrack, which can be opened by passengers, is covered up by the covering hood so that opening it is no longer possible. In this way it may be possible to prevent any erroneous use of the hatrack by passengers.

According to a further exemplary embodiment of the present invention, the covering hood comprises an attachment device of a hatrack flap, in such a manner that the covering hood can be integrated in the hatrack.

This option of replacing a hatrack flap by the covering hood may make it possible to ensure an unchanged outer shape of the hatracks in the overhead region. At the same time a replacement for a conventional hatrack flap is provided so that any erroneous use of the hatrack by passengers may be prevented.

According to a further exemplary embodiment of the present invention, the separation system further comprises a partition element, wherein the partition element extends into the hatrack orthogonally to the contour of the covering hood.

This separation element, which can, for example, be designed as a net, separation wall, rope, curtain or mesh, separates the separation system, which is installed on a hatrack, from adjacent hatracks in the aircraft's x-direction. In this arrangement, each possible separation element is designed in such a way that movements of deposited objects in adjacent hatracks do not slide into that region of the hatrack along the x-axis, in which region the separation system is located.

Furthermore, an exemplary embodiment is possible in which the hatrack, the separation element and the covering hood comprise a slot into which the movable space separation device can be inserted. Thus a minimum width of the slot can be predetermined. Furthermore, a reduction of the propagation of light, odour and noise between the spaces to be separated can be achieved.

According to a further exemplary embodiment of the invention, suspension of a movable space separation device with a separation element according to a previous exemplary embodiment is stated.

This may, for example, result in easier assembly and in improved and faster installation of the two elements to a hatrack. In this arrangement a modular solution is possible in which both elements are separate. However, it is also possible that both elements have previously been firmly affixed so that they can be installed as a single-piece shape.

According to a further exemplary embodiment of the invention, the use of a separation element in an aircraft is stated.

According to a further exemplary embodiment of the invention, an aircraft comprising a separation element is stated.

Further exemplary embodiments and advantages of the invention are set out in the following description of the figures. However, the invention is not limited to these exemplary embodiments.

The illustrations in the figures are diagrammatic and are not to scale.

DETAILED DESCRIPTION

Below, exemplary embodiments of the present invention are described with reference to the figures.

In the following description of the figures the same reference characters are used for identical or similar elements.

Figure 1:
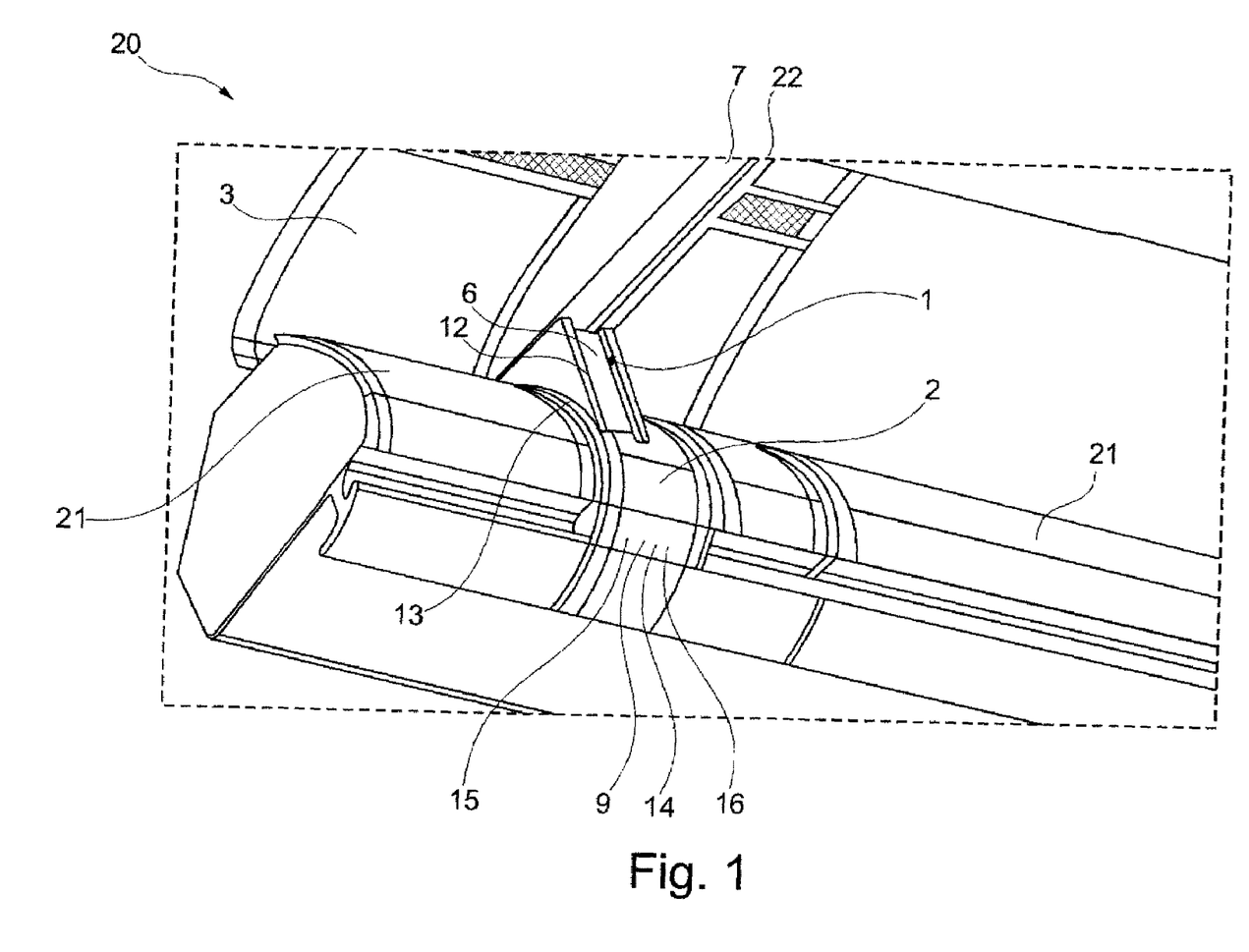
FIG. 1 shows a diagrammatic three-dimensional view of the separation system according to an exemplary embodiment of the invention.

FIG. 1 shows an exemplary embodiment of the invention. The illustration shows a separation element 1 for separating a first space 2 from a second space 3 in an aircraft, wherein the separation element comprises a first edge that can be oriented to a suspension device 7 of a movable space separation device; a second edge that can be oriented to a hatrack 9; and a third edge 6 that can be oriented to the movable space separation device. In this arrangement the first edge comprises a first edge progression that conforms to the suspension device 7, and the second edge comprises a second edge progression that conforms to the hatrack. Furthermore, the third edge 6 comprises a third edge progression 12 that conforms to the movable space separation device, wherein the first edge progression, the second edge progression and the third edge progression conform to such an extent that propagation of light between the first space and the second space is reducible.

FIG. 1 shows a view within an aircraft cabin with the direction of view being towards the cabin ceiling, wherein the illustration shows various hatracks 21 that are adjacent to the hatrack 9, which comprises a separation element 1.

FIG. 1 shows a separation system 20 according to an exemplary embodiment of the invention. In this arrangement a separation element 1 is shown, which due to its physical and shape-related design makes it possible to reduce propagation of light between the first space 2 and the second space 3. Among other things this is achieved in that the second edge of the separation element, which edge points in the direction of the hatrack 9, conforms to the hatrack in such a manner that a reducing effect relating to light transmission or lightproofness results. Likewise, the edge of the separation element, which in the image points upwards in the direction of the suspension device 7 of the movable space separation device, conforms to the shape and contour of the suspension device in such a manner that here too a reduction in the transmission of light between the spaces 2 and 3 results. In this arrangement the movable space separation device is not shown in the illustration. However, a curtain rail 22 is shown, on which, for example, a textile material curtain can be moved towards the hatrack 9 and the adjacent hatracks 21. The third edge 6, which points in the direction of the space separation device, conforms in such a manner to the contour and the shape of the space separation device used that in this region of the separation element, too, a reduction in light transmission, transmission of acoustic signals and of odours between the two spaces results. Furthermore, the third edge progression of the third edge is designated 12.

Furthermore, the covering hood 14 is shown, which in a separation system is placed underneath the separation element. In this arrangement the covering hood can be installed on an existing hatrack, but there is also the option of integrating the covering hood 14 in a hatrack 9 as a flap replacement. In this way a situation can be brought about in which undesirable opening of a hatrack on which a separation system is installed is not possible by passengers. FIG. 1 also shows that the contour of the covering hood 15 is designed in such a manner that the edge of the separation element 1, which edge points in the direction of the hatrack, closes off, in a lightproof manner and having positive fit, with the covering hood.

Furthermore, a geometrically variable sealing medium 13 is shown, which is selected in such a manner that in the case of possible twisting of the components involved, due to the action of force, for example during takeoff and landing of the aircraft, the desired reduction in light transmission is still achieved, because the medium elastically compensates for any movement that occurs. For example, an elastic sealing compound such as silicon can be used. In this arrangement, compensation is effected by the material-specific elasticity. However, it is also possible, for example, to use a brush construction of harder materials to this effect.

Figure 2:
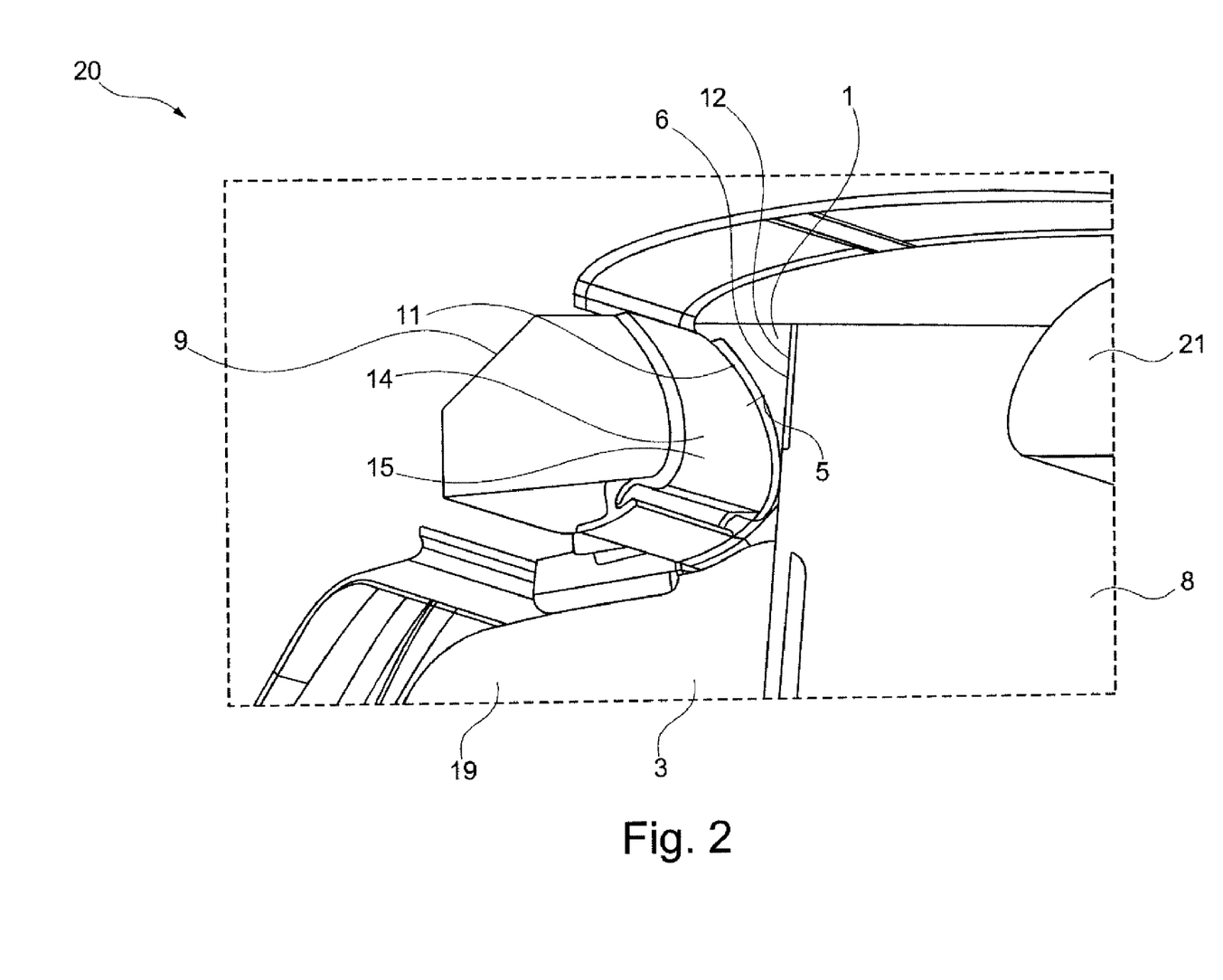
FIG. 2 shows a diagrammatic three-dimensional view of a separation system according to a further exemplary embodiment of the invention.

FIG. 2 shows a further separation system 20 according to a further exemplary embodiment of the present invention. The illustration shows a separation element 1 comprising a covering hood 14, wherein the covering hood comprises a contour 15. The illustration shows that the second edge 5 of the separation element 1, which in the example shown is installed on the hatrack 9 with the integrated covering hood 14, rests against the contour of the covering hood and fully conforms to said covering hood. Due to the conforming edge progression 11 of the second edge 5 a light-proof, noise-proof and odour-proof close-off results between the two objects whose surfaces conform to each other. Furthermore, a separation device 19 in the so-called underbin cabin region between the first space and the second space is shown. In the illustration the movable space separation device 8 is shown as a curtain, which space separation device 8 in this embodiment adjoins with a positive fit to the third edge 6 with the edge progression 12. Thus in this region, too, light-proof, noise-proof and odour-proof separation results between the separation element and the space separation device. In this illustration an opposing hatrack as a neighbouring hatrack 21 shows the centre region of an aircraft cabin. In this arrangement the separation system can not only be used in the lateral region of an aircraft fuselage, but also in centre regions and in further aircraft regions. Likewise, the application need not be restricted to the overhead region.

Figure 3:
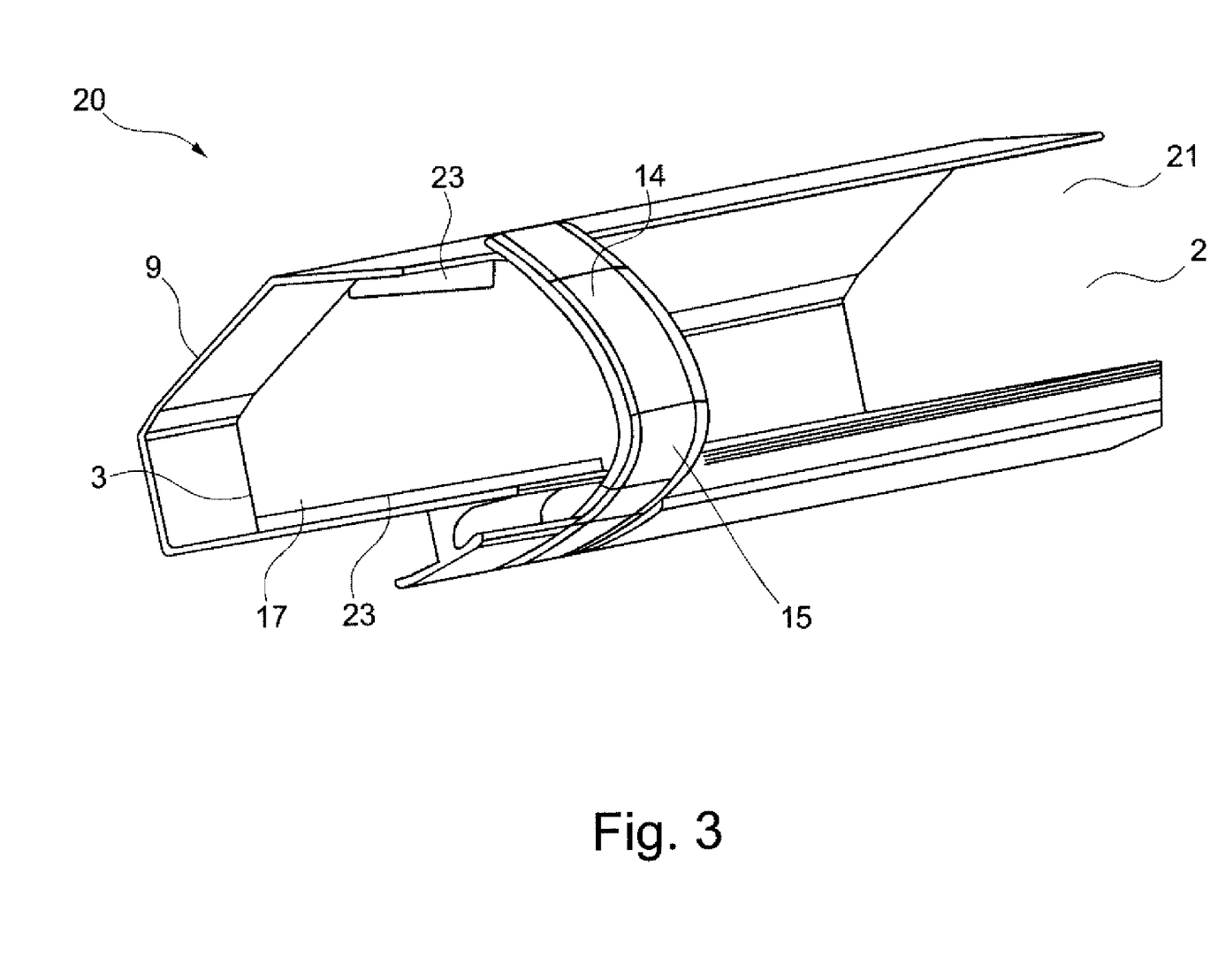
FIG. 3 shows a diagrammatic three-dimensional view of a separation system according to a further exemplary embodiment of the invention.

FIG. 3 shows a further exemplary embodiment of a separation system 20, wherein in this illustration a hatrack 9 comprises a covering hood 14. In this arrangement, furthermore, a separation element 17 is installed in the hatrack in order to separate the region, to which such a separation system is affixed, in lateral direction from adjacent hatracks 21. In this arrangement the separation element 17 is shown as a separation wall in this illustration, but a design as a net or a mesh is also possible. In this arrangement it is, above all, items of passenger baggage that are to be prevented from sliding into the region of the separation system in the hatrack, which has assumed a new function as part of the separation system. Furthermore, various attachments 23 are shown. The illustration clearly shows that the contour of the covering hood 15 conforms to the contour of a hatrack, and thus a closed surface and thus a closed visually attractive appearance can be achieved.

Figure 4:
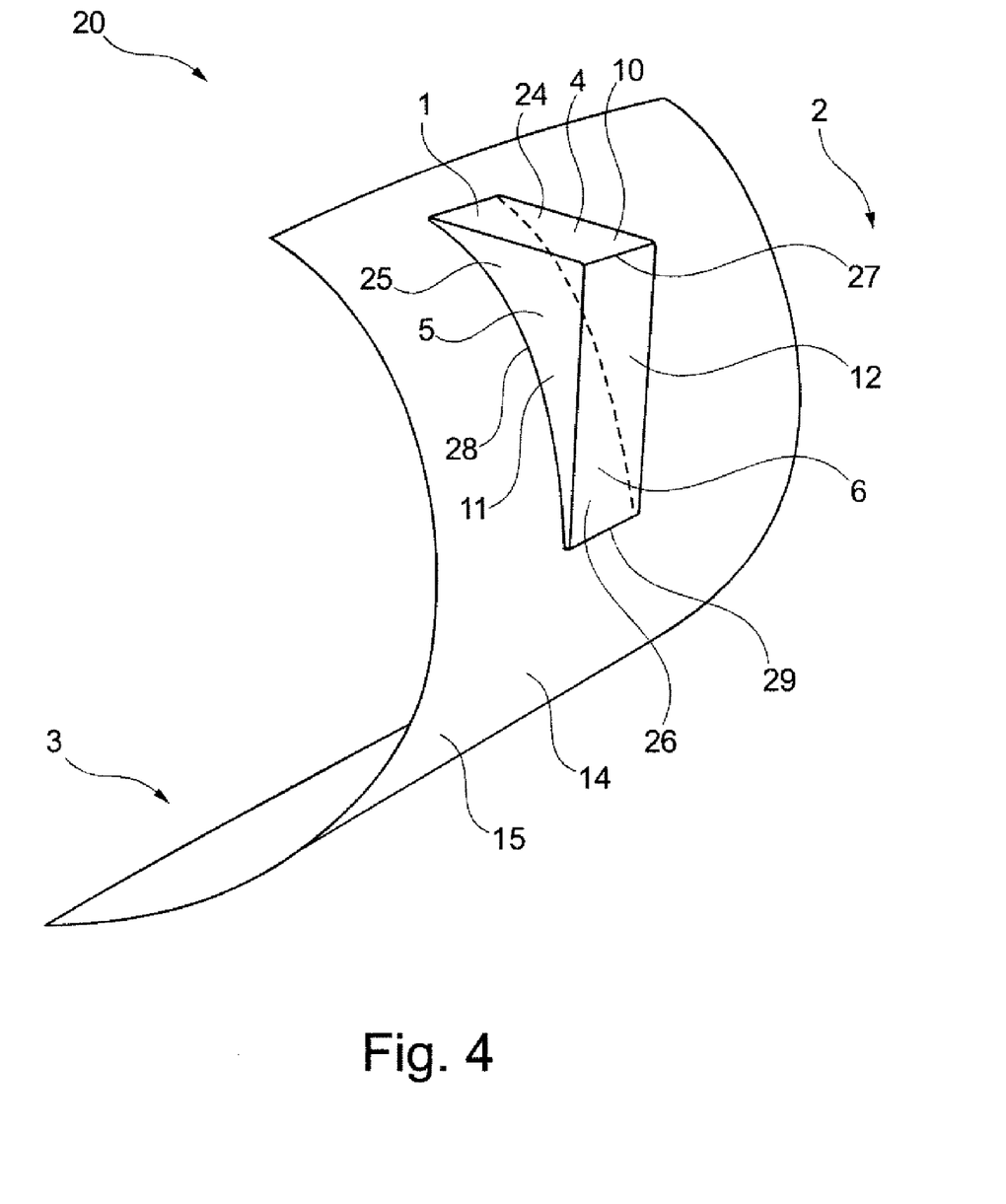
FIG. 4 shows a diagrammatic three-dimensional view of a separation system according to a further exemplary embodiment of the invention.

FIG. 4 shows a further exemplary embodiment of a separation system 20 that comprises a covering hood 14 with a contour 15 and a separation element 1. In this arrangement the separation element comprises a first, a second and a third edge, wherein the first edge 4 in this view is shown pointing upwards. The second edge 5, which is oriented towards the covering hood 14, and the third edge 6, which is oriented towards the space separation device (not shown), are shown.

In this arrangement the first edge surface 24 comprises a first delimitation 27, the second edge surface 25 comprises a second delimitation 28, and the third edge surface 26 comprises a third delimitation 29. As shown in this example, the contour of the second edge surface conforms to the contour of the covering hood 15, having positive fit. This can result in maximum checking of the transmission of light, noise and odours between the first space 2 and the second space 3. Likewise, in a further exemplary embodiment the third edge surface 26 can be designed having positive fit with the movable space separation device. Likewise, the first edge surface 24 can be designed having positive fit with the suspension device of the movable space separation device. Thus lightproof separation between the first space 2 and the second space 3 in combination with the movable space separation device and possible further separation devices between space 1 and space 2 are achieved.

Figure 5:
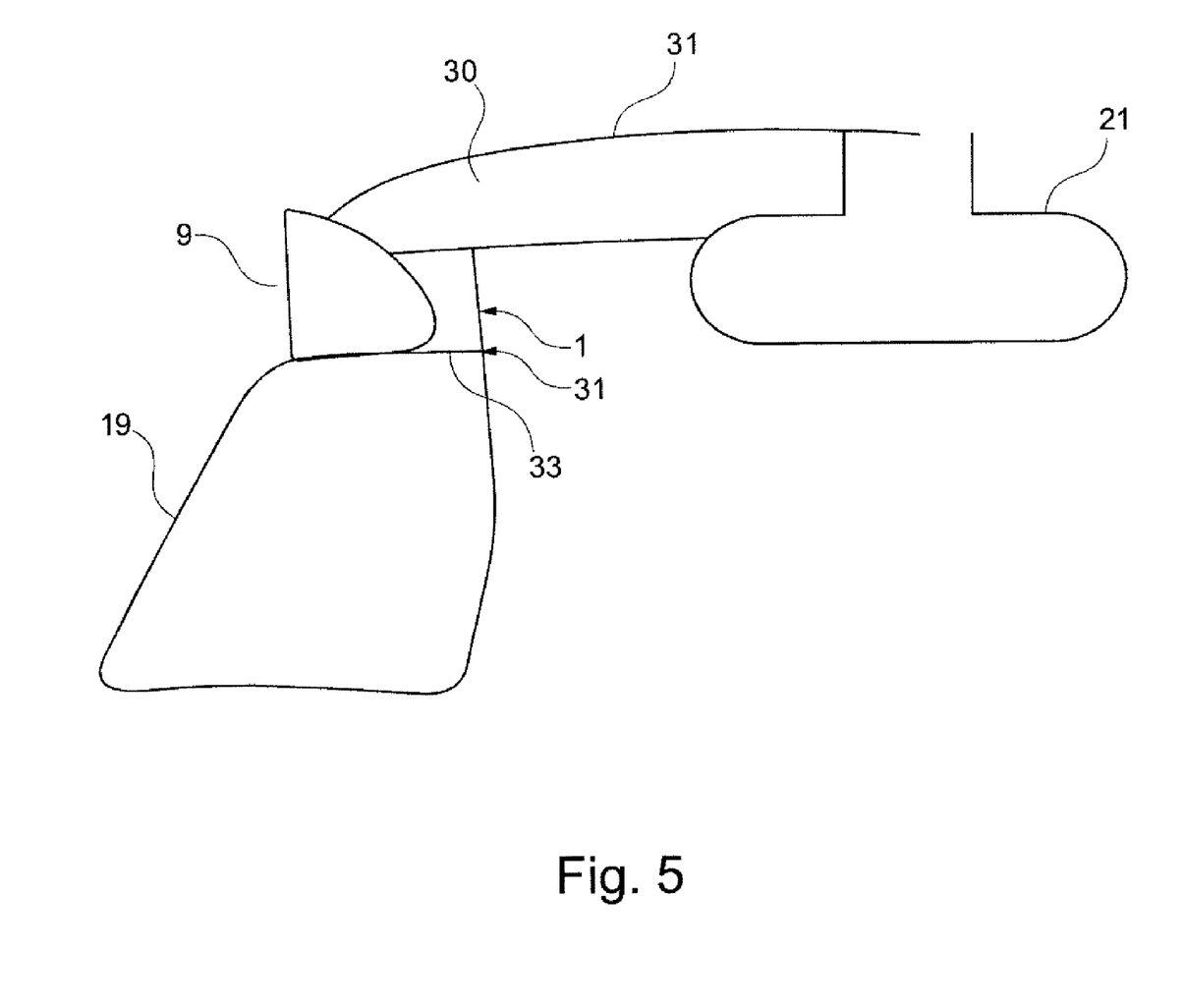
FIG. 5 shows a diagrammatic two-dimensional view of a separation element according to a further exemplary embodiment of the invention.

FIG. 5 shows a further exemplary embodiment of a separation element 1 which is attached to one of the following positions: to the separation device 19, which in this case is designed as a separation wall; between the first and the second space; to the curtain rail panel (so-called curtain header or header panel) 30; or to the hatrack 9. In order to obtain better lightproofness, the contour of the separation element in this region of the transition 32 makes a transition to the contour of the separation wall 19. To this effect the separation element comprises a fourth edge 33 that can be oriented towards the separation device 19, wherein the fourth edge comprises a fourth edge progression 34 that conforms to the separation device 19. The exemplary embodiment also applies to the centre region and other regions in the aircraft, without there being a drawing of these.

Figure 6:
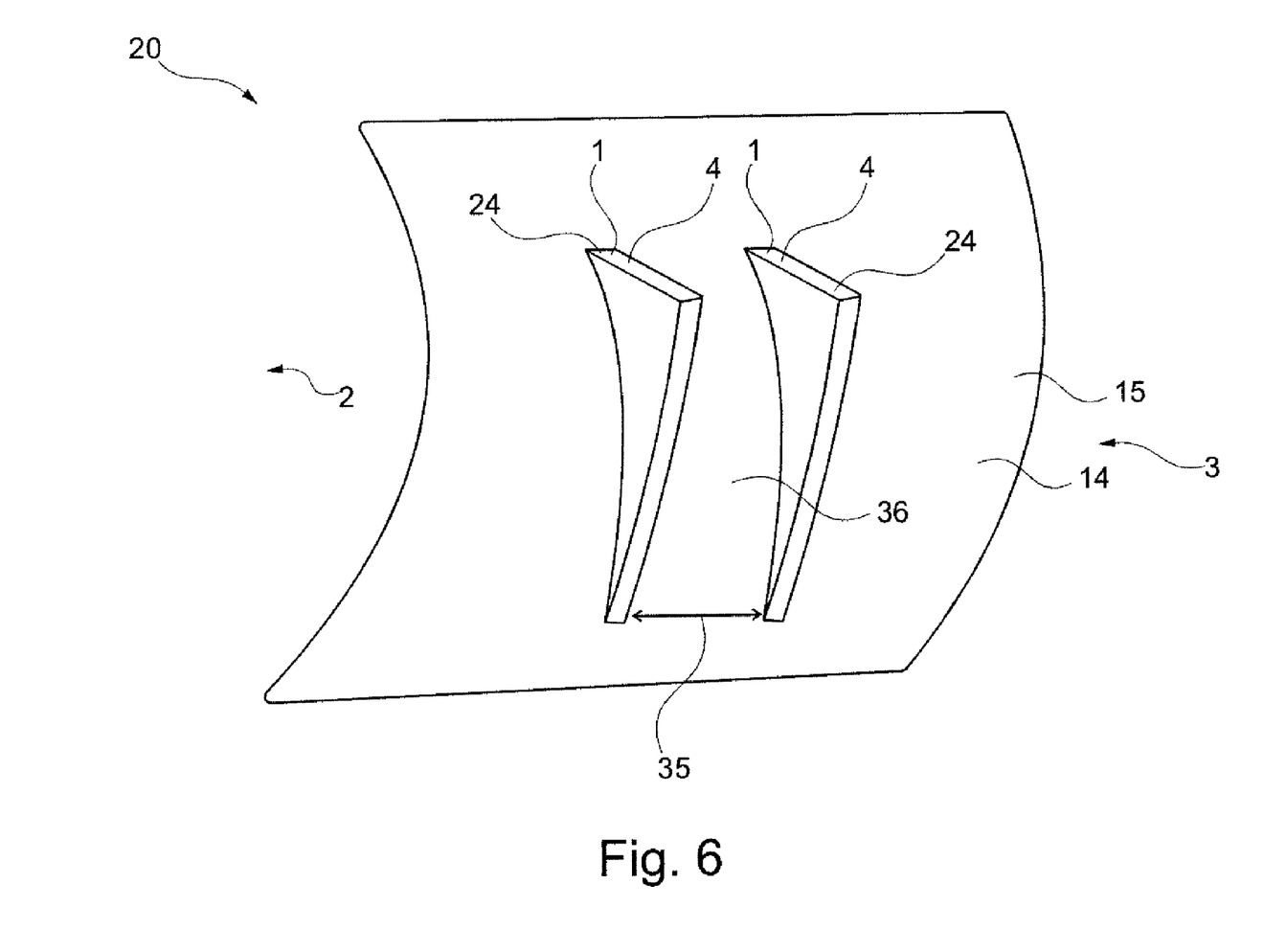
FIG. 6 shows a lateral view of a diagrammatic three-dimensional illustration of a separation system according to a further exemplary embodiment of the invention.

FIG. 6 shows a further exemplary embodiment of a separation system 20 which comprises a covering hood 14 with a hatrack flap contour 15 or a hatrack flap with a contour and two separation elements 1. The diagram shows the first edges 4 of the separation elements 1 with the first edge surfaces 24. In this arrangement the two separation elements are separated from each other by a minimum distance 35; laterally they delimit the space 36 that is provided for insertion of the movable space separation device. In this arrangement the propagation of light between the spaces 2 and 3 is achieved by combining the two separation elements with the movable space separation device. The two separation elements can thus act as lateral surfaces of the separation system.

Figure 7:
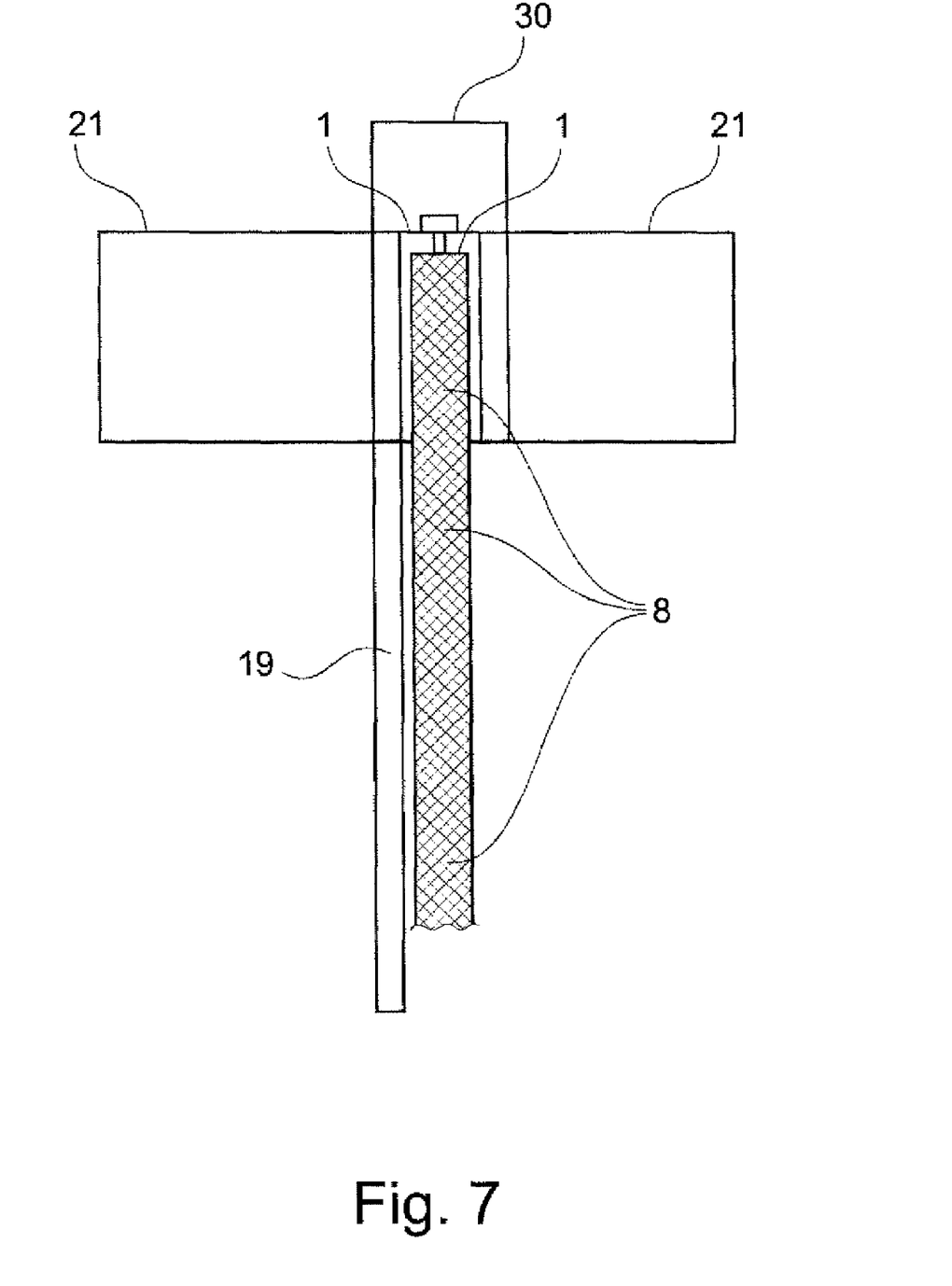
FIG. 7 shows a diagrammatic two-dimensional view of a separation element according to a further exemplary embodiment of the invention.

FIG. 7 shows a lateral view of a further exemplary embodiment of a separation system 20. The diagram shows adjacent hatracks 21. In this arrangement the two separation elements 1, between which a movable space separation device 8 can be inserted, are installed on the hatrack that is situated behind. Furthermore, the curtain rail panel/header panel 30 and an additional separation device 19 are shown, with the latter supporting a reduction in the propagation of light. In this arrangement the contour of one of the separation elements can conform, having positive fit, to the contour of the separation device 19.

Figure 8:
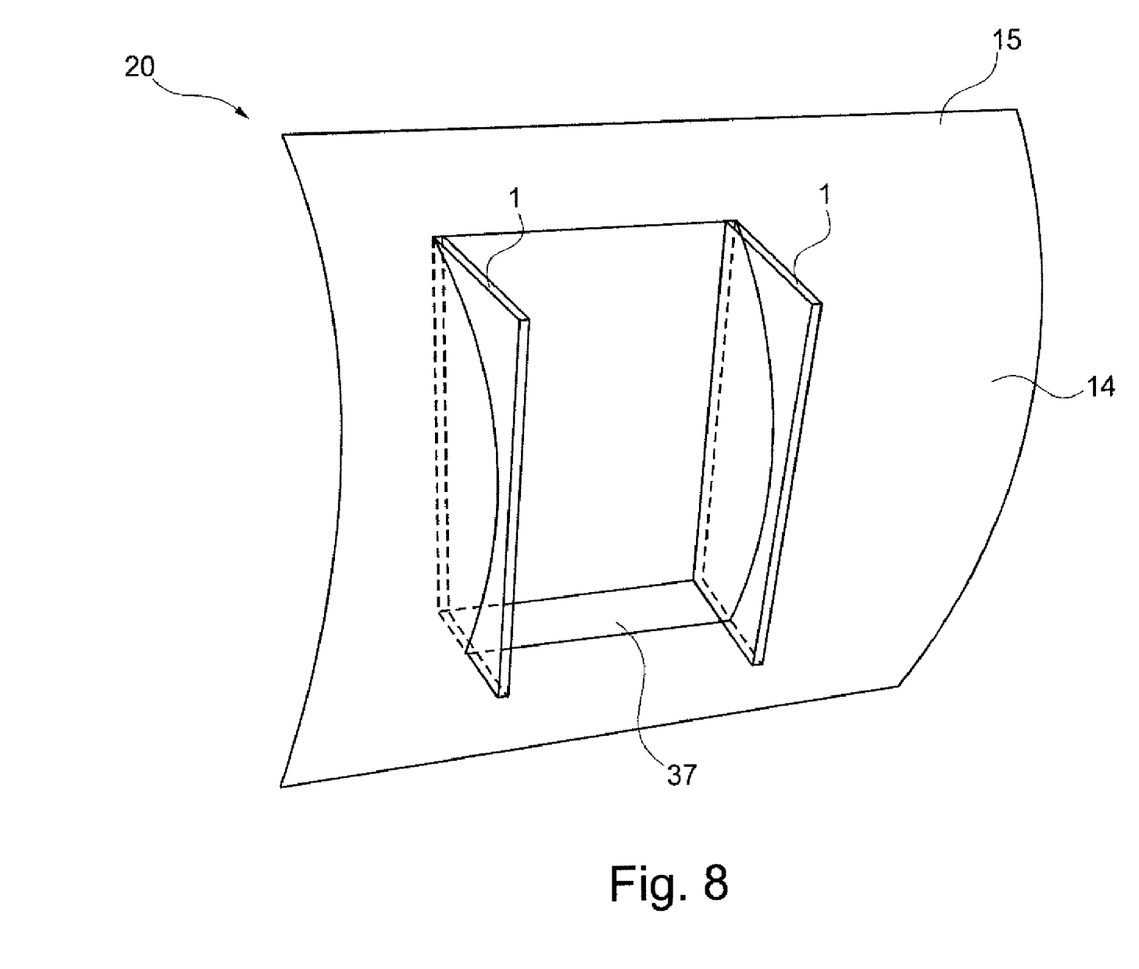
FIG. 8 shows a diagrammatic three-dimensional view of a separation system according to a further exemplary embodiment of the invention.

FIG. 8 shows a further exemplary embodiment of a separation system 20. In this arrangement, in the covering hood 14 with the contour 15 such a recess 37 is produced that the movable space separation device (not shown) can be guided between the two separation elements 1 and into the recess. It is thus possible to move the space separation device further along the Y-axis into the separation system than would be possible without this recess. It is thus possible to move the space separation device further along the y-axis into the separation system than would have been possible without this recess. As a result of the combination of the separation elements and the recess it is possible to achieve improved lightproofness.

Figure 9:
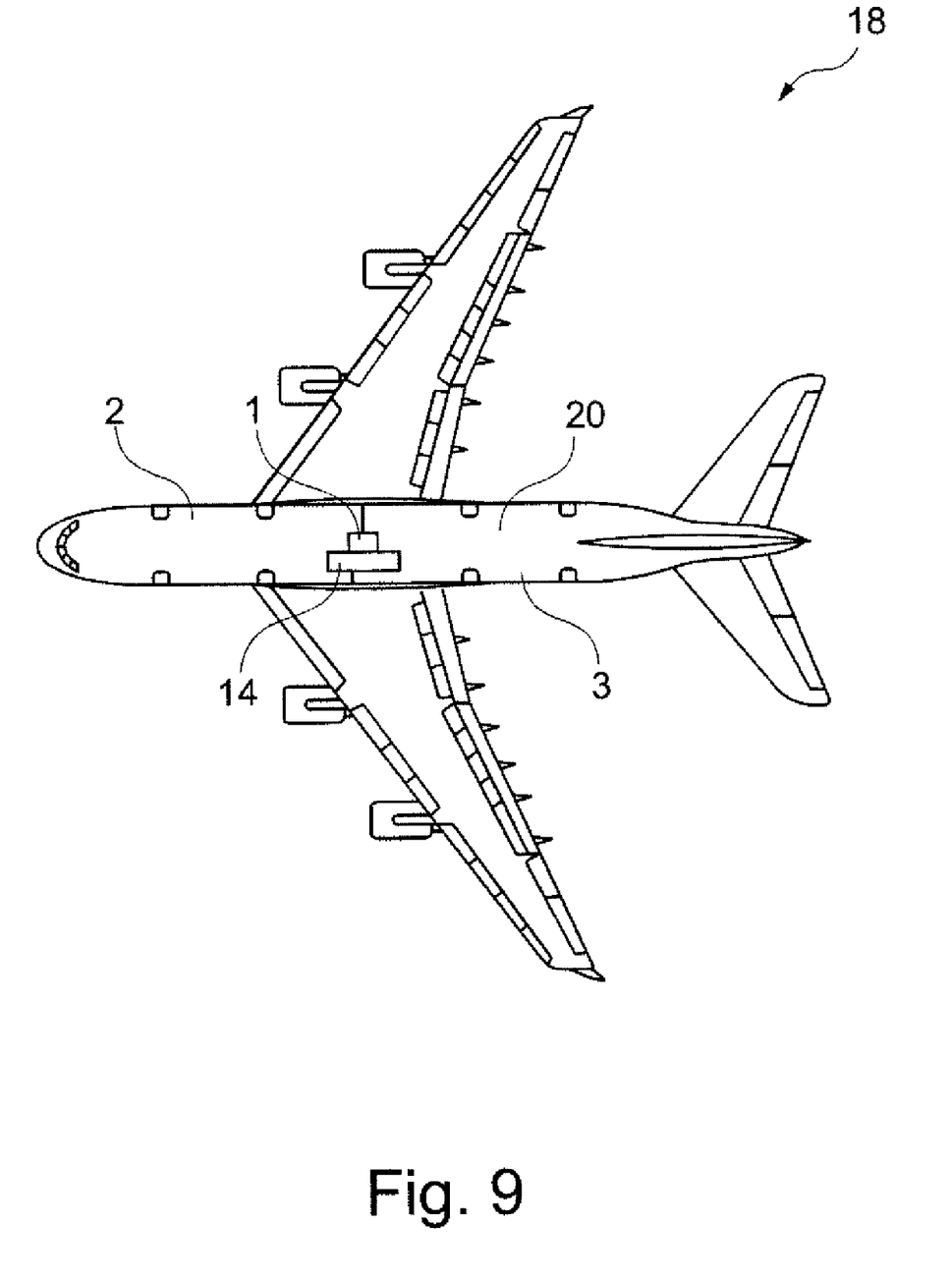
FIG. 9 shows an aircraft comprising a separation system according to a further exemplary embodiment of the invention.

FIG. 9 shows an aircraft 18 comprising a separation system 20 according to a further exemplary embodiment of the invention. The illustration shows two spaces 2 and 3 that are to be separated, which spaces 2 and 3 are separated, by means of the separation system 20 that comprises a separation element and a covering hood, so as to be light-proof, noise-proof and odour-proof.

In other words, due to the separation element and the separation system, it is possible to achieve lightproofness between two different classes in an aircraft, as well as achieving noise containment and an odour barrier. Moreover, economical implementation is possible, as is the utilisation of rebuilt existing components according to a modular principle. As a result of the separation element and the transport system it is possible, for example, to implement visual simulation or other light effects on the cabin ceiling, without any negative effect as a result of incident light. This can result in better customer acceptance or an increased recognition value to aircraft operators, which increased recognition value can result in an overall enhancement of their image. As far as the cabin crew is concerned, simple operation of the movable space separation device can be achieved, wherein there is no need to provide conformity to the hatrack contours by the movable space separation device. Likewise, a simple shape of the header geometry can be made possible.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Separation element
2 First space
3 Second space
4 First edge
5 Second edge
6 Third edge
7 Suspension device of the movable space separation device
8 Moveable space separation device
9 Hatrack
10 First edge progression of the first edge
11 Second edge progression of the second edge
12 Third edge progression of the third edge
13 Geometrically variable sealing medium
14 Covering hood
15 Contour of the covering hood
16 Position of a closing device
17 Separation element
18 Aircraft
19 Separation between space 1 and space 2
20 Separation system
21 Adjacent other hatracks
22 Curtain rail
23 Attachment
24 First edge surface
25 Second edge surface
26 Third edge surface
27 Delimitation of the first edge surface
28 Delimitation of the second edge surface
29 Delimitation of the third edge surface
30 Curtain rail panel/header panel
31 Cabin ceiling
32 Transition from the separation element to the separation wall
33 Fourth edge
34 Fourth edge progression
35 Minimum distance for movable space separation device
36 Clearance for movable space separation device
37 Recess in the covering hood/in the hatrack

The invention claimed is:

1. A separation element for creating a first space and a second space in an aircraft having a hatrack associated with a suspension device, the separation element comprising:
a first edge having a first edge surface conforming to the suspension device;
a second edge having a second edge surface conforming to the hatrack;
wherein, when the separation element is installed in the aircraft, the first edge and the second edge reduce the propagation of light between the first space and the second space and the hatrack and the suspension device;
a covering hood associated with the second edge, the covering hood covering at least a portion of the hatrack when the separation element is installed such that it is ensured that opening of the hatrack is no longer possible.

2. The separation element of claim 1, wherein the first edge comprises a geometrically variable sealing medium forming the first edge surface, the first edge surface having a positive fit with the suspension device.

3. The separation element of claim 2, wherein the geometrically variable sealing medium reduces light propagation between the first space and the second space during relative movement of the separation element and the suspension device.

4. The separation element of claim 1, wherein the second edge comprises a geometrically variable sealing medium forming the second edge surface, the second edge surface having a positive fit with the hatrack device.

5. The separation element of claim 4, wherein the geometrically variable sealing medium reduces light propagation between the first space and the second space during relative movement of the separation element and the hatrack device.

6. The separation element of claim 4, wherein the first geometrically variable sealing medium and the second geometrically variable sealing medium are the same mediums.

7. The separation element of claim 1, wherein the first edge comprises a first geometrically variable sealing medium forming the first edge surface and the second edge comprises a second geometrically variable sealing medium forming the second surface.

8. The separation element of claim 1, wherein the separation element further includes a separation device, the separation element further comprising a third edge conforming to the separation device.

9. The separation element of claim 1, wherein a contour of the covering hood conforms to a contour of the hatrack and the second edge of the separation element.

10. The separation element of claim 1, wherein the separation element is formed from two spaced apart parallel elements.

11. A separation system for separating a space of an aircraft into a first space and a second space at a position where the aircraft includes a suspension device of a moveable space separation device, the separation system comprising:
 a separation element;
 a covering hood;
 the separation element comprising a first edge having a first edge surface conforming to the suspension device of the moveable space separation device;
 the separation element comprising a second edge having a second edge surface conforming to the hatrack;
 the separation element comprising a third edge having a third a third edge surface conforming to the movable space separation device;
 wherein a contour of the covering hood conforms to the second edge of the separation element;
 wherein the covering hood is either integrated in the hatrack as a replacement of a hatrack flap or is installed on an existing hatrack such that it is ensured that opening of the hatrack is no longer possible, and
 wherein the contour of the covering hood closes off, having positive fit, with the contour of the second edge surface of the separation element in such a manner that propagation of light between the first space and the second space is reduced.

12. The separation system of claim 11, wherein said first edge is formed from a geometrically variable sealing medium to seal the edge against the suspension device and the second edge is formed from a geometrically variable sealing medium to seal the second edge against the hatrack.

13. The separation system of claim 11, comprising a separation device, wherein the separation device is moveable.

14. The separation system of claim 11, comprising a separation device, wherein the separation device is one of a wall and a curtain.

15. The separation system of claim 11, wherein the hatrack includes an opening mechanism covered by the hood.

16. The separation system of claim 11, wherein the separation system further comprises a partition element, the partition element extending into the hatrack orthogonally to the contour of the hood.

17. An aircraft comprising:
 a fuselage having a longitudinal axis;
 a suspension device associated with the fuselage;
 a hatrack supported by the suspension device, the hatrack extending along the longitudinal axis of the aircraft;
 a separation element, the separation element separating the fuselage into a first space and a second space, the separation element having a first surface associated with the suspension device and a second surface associated with the hatrack, the two surfaces inhibiting the propagation of light between the first space and the second space between the suspension device and the hatrack;
 a covering hood associated with the separation element, the covering hood covering at least a portion of the hatrack when the separation element is installed such that it is ensured that opening of the hatrack is no longer possible.

18. The aircraft of claim 17, further comprising a separation device, the separation device aligned transverse to said longitudinal axis of said fuselage, the separation device associated with a third surface of said separation element.

* * * * *

UNITED STATES PATENT AND TRADEMARK OFFICE
CERTIFICATE OF CORRECTION

PATENT NO.         : 8,118,258 B2
APPLICATION NO.    : 12/399172
DATED              : February 21, 2012
INVENTOR(S)        : Michael Mosler, Andreas Neumann and Benjamin Landes Page 1 of 1

It is certified that error appears in the above-identified patent and that said Letters Patent is hereby corrected as shown below:

In the Specifications:

Col. 1, Line 39, "conflict" should read --conflicts--.

Col. 1, Line 63, "conforms" should read --conform--.

Col. 1, Line 65, "conforms" should read --conform--.

Col. 1, Line 67, "conforms" should read --conform--.

Col. 2, Line 32, "is" should read --are--.

Col. 4, Line 8, "a" should read --an--.

Col. 6, Line 59, insert --,-- before and after "too".

Col. 8, Line 33, "space" should read --spaces--.

In the Claims:

Col. 11, Line 19, delete "a third" before "edge surface conforming to the movable".

Signed and Sealed this
Ninth Day of July, 2013

Teresa Stanek Rea
*Acting Director of the United States Patent and Trademark Office*